United States Patent [19]
Anthony et al.

[11] 3,859,058
[45] Jan. 7, 1975

[54] CORROSION RESISTANT ALUMINUM COMPOSITE MATERIAL

[75] Inventors: William H. Anthony, Guilford; Thomas S. Rasmussen, Bridgeport, both of Conn.

[73] Assignee: Swiss Aluminium Ltd., Chippis, Switzerland

[22] Filed: Oct. 4, 1973

[21] Appl. No.: 403,450

[52] U.S. Cl. ................... 29/191, 29/195, 29/197.5, 138/143
[51] Int. Cl. .......................................... B32b 15/20
[58] Field of Search .............. 29/197.5, 195 Y, 191; 138/140, 143

[56] References Cited
UNITED STATES PATENTS

| | | | |
|---|---|---|---|
| 3,098,724 | 7/1963 | Anderson | 29/197.5 |
| 3,100,581 | 8/1963 | Vandenburgh | 29/197.5 |
| 3,290,125 | 12/1966 | Pryor | 29/197.5 |
| 3,436,804 | 4/1969 | Broverman | 29/197.5 |
| 3,717,915 | 2/1973 | Teubler | 29/197.5 |

*Primary Examiner*—L. Dewayne Rutledge
*Assistant Examiner*—Arthur J. Steiner
*Attorney, Agent, or Firm*—Robert H. Bachman

[57] ABSTRACT

A corrosion resistant aluminum composite material is disclosed which comprises a core containing from .5 to 3% magnesium, from .3 to 1% manganese, and from .1 to .3% chromium with the balance being essentially aluminum, and a layer of cladding material metallurgically bonded to at least one surface of the core, with the cladding material consisting of from .2 to 1.5% manganese and from .03 to .3% silicon with the balance being essentially aluminum. The composite material possesses a unique combination of mechanical properties and corrosion resistance and is highly suited for the fabrication of heat exchangers for use in an aqueous environment.

15 Claims, No Drawings

CORROSION RESISTANT ALUMINUM COMPOSITE MATERIAL

BACKGROUND OF THE INVENTION

A great deal of effort has been made to use aluminum and aluminum base alloys in heat exchangers for use with aqueous media and in general to use aluminum and aluminum alloys in situations where the alloys contact flowing streams of impure water. In general, these efforts have not been successful and a great deal of difficulty has been encountered with the corrosion of alloys heretofore suggested.

The primary difficulty encountered is the formation of localized corrosion or pitting. Once small pits start to form, corrosion activity is largely limited to these pits and perforation of the alloy occurs much more rapidly than it would if the corrosion were more general instead of being highly localized.

The preceding problem has been largely overcome by the novel composite material of the present invention. The composite material of the present invention possesses an extremely low general corrosion rate and has the property that pit depth can be easily limited.

SUMMARY OF THE INVENTION

The composite material of the present invention consists of an aluminum alloy core containing from .5 to 3% magnesium, from .3 to 1% manganese, and from .1 to .3% chromium, balance essentially aluminum. Metallurgically bonded to this core is an aluminum alloy cladding which contains from .2 to 1.5% manganese and from .03 to .3% silicon with the balance being essentially aluminum.

The core alloy possesses a unique resistance to pitting corrosion. The cladding alloy is anodic with respect to the core material and thus provides galvanic corrosion protection. The corrosion rate of the cladding material is low relative to other commonly used aluminum alloys. Thus a relatively thin layer of cladding material can provide long term corrosion protection to the core material. Because of the resistance to pitting of the core material, pit depth is almost entirely restricted to the thickness of the cladding layer and thus may easily be controlled by controlling the thickness of the cladding layers.

The composite material of the present invention may easily be fabricated using conventional commerical practice to pressure weld the components of the composite.

Additional advantages and benefits of the present invention will be made more apparent through reference to the following Description of the Preferred Embodiments in combination with the claims.

DESCRIPTION OF THE PREFERRED EMBODIMENTS

The composition of the components of the present invention in the following description of the preferred embodiments is given in weight percentages unless otherwise specified.

The broad and preferred composition limits for the core material of the present invention are given in Table I below:

TABLE I

| Alloying Addition | Allowable % Range | Preferred % Range |
|---|---|---|
| Magnesium | 0.5 – 3.0 | 0.8 – 1.2 |
| Manganese | 0.3 – 1.0 | 0.4 – 0.7 |
| Chromium | 0.1 – 0.3 | 0.2 – 0.3 |
| Titanium | 0.00 – 0.03 | 0.01 – 0.2 |
| Silicon | 0.00 – 0.3 | 0.00 – 0.15 |
| Iron | 0.00 – 0.20 | 0.00 – 0.06 |
| Copper | 0.00 – 0.10 | 0.00 – 0.01 |
| Zinc | 0.00 – 0.1 | 0.00 – 0.05 |
| Aluminum | Balance | Balance |

The essential components of the core are magnesium, manganese and chromium. Titanium, silicon and iron may be present as impurities within the limits shown in Table I. No detrimental effects have been observed when these three elements are present within the limits shown in Table I. Titanium may be present as a purposeful addition since it has been found to give a beneficial grain refining effect, thereby improving the mechanical properties of the core material. Copper and zinc may be present as impurities up to the level shown in Table I. However, these elements have been shown to have a detrimental effect on the corrosion properties of the core material and are preferably limited to be below the limits given in Table I if maximum corrosion resistance is desired in the core material. Naturally, any of the foregoing impurity elements may be present in levels as low as 0.001%.

The broad and preferred composition ranges for the cladding material are given in Table II below:

TABLE II

| Alloying Addition | Allowable % Range | Preferred % Range |
|---|---|---|
| Magnesium | 0.0 – 0.1 | 0.0 – 0.05 |
| Manganese | 0.2 – 1.5 | 0.3 – 1.0 |
| Chromium | 0.0 – 0.1 | 0.02 – 0.05 |
| Titanium | 0.00 – 0.03 | 0.01 – 0.02 |
| Silicon | 0.03 – 0.30 | 0.0 – 0.25 |
| Copper | 0.00 – 0.05 | 0.00 – 0.01 |
| Zinc | 0.00 – 0.40 | 0.00 – 0.25 |
| Aluminum | Balance | Balance |

The essential components of the cladding alloy are manganese and silicon. Magnesium, titanium, and zinc may be present as impurities up to the levels shown in Table II. These four elements do not adversely effect the corrosion behavior of the cladding material when present in the limits shown in Table II. Zinc has not been found to have any detrimental effects on the corrosion behavior of the cladding and its level has been chosen so that zinc bearing scrap may be used in the production of the cladding alloy. Naturally, any of the foregoing impurities may be present in levels as low as .001%.

The alloying composition of the core component was developed to have a relatively low weight loss and moderate pitting rate while the cladding material was formulated to provide exceptional galvanic protection to the core material.

The composite of the present invention may be produced utilizing a wide variety of processes. Typical processes which may be utilized include processes which utilize cold deformation such as swaging or rolling and processes which utilize the deformation at elevated temperatures such as hot rolling. An exemplary process for the fabrication of the composite of the present invention is described in U.S. Pat. No. 3,381,366 issued to Joseph Winter and assigned to the Assignee of the present application.

The composite of the present invention has a wide variety of uses. Almost any metallic item intended for use in a corrosive aqueous environment at moderate temperatures may be fabricated from the composite of the present invention. The thickness of the cladding material is largely dependent upon the length of exposure which the item must withstand before being replaced. The thickness of the core may be established on the basis of mechanical properties which the finished item must possess. In general, the cladding thickness will range from .001 to .100 inches.

If the composite is produced in the form of sheet, further objects such as tubing may readily be fabricated from the sheet. If tubing is fabricated from the composite of the present invention for heat exchange purposes, the tubing will preferably have a wall thickness of from .010 to .050 and a cladding thickness of from .001 to .020 inches. Tubing made of the material of the present invention may be fabricated into further objects such as fin on tube heat exchangers.

Normally, it is only necessary to place a cladding surface on that surface which is to be exposed to the corrosive aqueous environment. As for example, in a surface condenser used to condense waste steam using corrosive cooling water, the cladding would be present only on the water side. However, in the fabrication of the tubing heat exchanger to exchange heat between two media, both of which are corrosive it would be necessary to fabricate the tubing from a composite material having cladding on both sides.

The preceding discussion of the present invention will be better understood through consideration of the following illustrative examples:

EXAMPLE I

A series of six experimental alloy ingots were cast. The composition of these alloys is given in Table III, as items A through F. Items G through J are commercial aluminum alloys shown for purposes of comparison (designations are those of the Aluminum Association and the compositions listed for the commercial alloys are nominal).

The ingots were homogenized and then reduced to .050 inches gauge strip using conventional processing techniques, namely hot and cold rolling with the intermediate anneals. The final condition was H14 temper, half hard condition. These experimental alloys along with some standard aluminum alloys were tested for corrosion resistance as described in Example II.

4034-MAL

TABLE III

SPECTROSCOPIC COMPOSITION AND CORROSION OF ALLOYS IN FLOWING WATER

| Alloy Designation | Si | Fe | Mn | Mg (1) | Cr (2) | Cu (3) | Zn (4) | Ti (5) | Weight Loss mg/cm$^2$ 60 Day | 120 Day | 180 Day | Mean Pit Depth (mils) 60 Day | 120 Day | 180 Day | Max. Pit Depth (mils) 60 Day | 120 Day | 180 Day | Sheet Thick. (mils) |
|---|---|---|---|---|---|---|---|---|---|---|---|---|---|---|---|---|---|---|
| A | .23 | .051 | .31 | - | - | - | - | - | 15.1 | 25.1 | 35.1 | 8.4 | 8.7 | 12.6 | 17.8 | 12.4 | 21.0 | 50.0 |
| B | .23 | .055 | .45 | - | - | - | - | - | 15.4 | 23.9 | 33.6 | 8.8 | 9.5 | 11.7 | 15.3 | 15.8 | 15.3 | 50.0 |
| C | .10 | .063 | .64 | - | - | - | - | - | 14.2 | 23.2 | 29.6 | 10.2 | 8.7 | 12.5 | 19.7 | 14.5 | 22.6 | 50.0 |
| D | .11 | .016 | .62 | - | - | - | - | - | 9.0 | 18.7 | 29.2 | 9.4 | 9.9 | 15.0 | 20.9 | 15.8 | 23.6 | 50.0 |
| E | .068 | .052 | .58 | .89 | .22 | - | - | - | 1.6 | 5.9 | 16.4 | 10.9 | 14.1 | 17.5 | 21.0 | 19.5 | 22.6 | 50.0 |
| F | .098 | .061 | .61 | 1.04 | .21 | - | - | - | 10.3 | 18.7 | 23.1 | 16.7 | 12.4 | 19.4 | 22.4 | 19.3 | 26.4 | 50.0 |
| G 1100 H14 | Commercial Purity Aluminum | | | | | | | | 15.5 | 27.2 | 34.3 | 26.9 | 26.3 | 33.7 | 43.7 | 39.2 | 39.8 | 58.4 |
| H 3003 H14 | - | - | 1.2 | - | - | - | - | - | 17.7 | 26.2 | 29.4 | - | - | - | - | - | - | 27.4 |
| I 5052 H32 | - | - | - | 2.5 | .25 | - | - | - | 5.1 | 10.6 | 17.2 | - | - | - | - | - | - | 39.4 |
| J 6061 T6 | .6 | - | - | 1.0 | .20 | .25 | - | - | 20.0 | 30.4 | 24.1 | 16.4 | 19.4 | 21.5 | 24.0 | 36.0 | 34.4 | 57.0 |

(1) Mg less than .01 unless otherwise noted
(2) Cr less than .01 unless otherwise noted
(3) Cu less than .015 unless otherwise noted
(4) Zn less than .02 unless otherwise noted
(5) Ti less than .01 unless otherwise noted Absence of mean pit depth data and max. pit depth data indicates that specimen sheet was perforated by a pit initiated from one side.

EXAMPLE II

The experimental alloy strip materials were exposed to an aggressive cooling water for periods of 60 days, 120 days and 180 days. The approximate composition of the cooling water is given in Table IV below:

TABLE IV

| | | |
|---|---|---|
| Chlorides | 12.0 | ppm |
| Hardness (CaCO$_3$) | 38.0 | ppm |
| Alkalinity (CaCO$_3$) | 20.0 | ppm |
| CO$_2$ | 3.0 | ppm |
| O$_2$ | 12.0 | ppm |
| Calcium | 14.2 | ppm |
| Copper | 0.05 | ppm |
| Iron | 0.15 | ppm |
| Magnesium | 0.0 | ppm |
| Sodium | 4.0 | ppm |
| Sulfate | 65.0 | ppm |
| Total Solids | 100.0 | ppm |
| pH | 6.8 | ppm |

The cooling water was heated to a temperature of 30° C and was caused to flow over the samples at a rate of 4 ft./sec. After the desired exposure time the samples were evaluated for weight loss, mean pit depth and maximum pit depth. This data is given in Table III.

A preliminary analysis of this data indicated that the experimental alloys could be classified into three main groups as follows:

GROUP 1 — consisting of alloys A, B, C and D, having silicon and manganese as primary alloy constituents. These alloys were characterized by a tendency to form shallower pits than the other experimental and commercial alloys.

GROUP 2 — consisting of alloys E and F having silicon, magnesium, manganese and chromium as primary alloying constituents. This group of alloys had a relatively low rate of weight loss and exhibited moderate pitting attack.

GROUP 3 — comprising all commercial alloys. This group contains alloys whose pitting rate and weight loss was greater than those alloys in Groups 1 and 2.

Previous experimental work had indicated that the alloys in Group 1 would, in general, be anodic to the alloys in Groups 2 and 3 and therefore that a cladding of an alloy from Group 1 could be used to protect a core material selected from Groups 2 and 3. An experiment based on this premise was performed and is summarized in Example III.

EXAMPLE III

A series of galvanic couples were made up using alloys from Group 1 as anodes in combination with alloys from Groups 2 and 3 as cathodes. These couples were immersed in flowing water as described in Example II. The resulting galvanic current between the cathodes and anodes was measured as a function of exposure time up to 60 days. It was found that the anodes provided a protective non-reversing electric current having a magnitude of from 1 to 10 microamps per square centimeter of cathode surface area. At the completion of 60 days exposure, the galvanic couples were disassembled and the cathodes were evaluated for corrosion damage. The results of this analysis are shown in Table V.

It is known from electro-chemical theory that the rate of metal loss or wastage is directly proportional to the magnitude of the current. In order that the composite material have a long life, it is desirable that the current be as low as possible.

TABLE V

| | | Spectroscopic Analysis of Anode and Cathode Alloys | | | | | | Average Current Density on Cathode | Average Pit Depth on Cathodes (mils) | Percentage Reduction In Average Pit Depth on Cathode Compared to Freely Corroding Material |
|---|---|---|---|---|---|---|---|---|---|---|
| | | Si | Fe | Mn | Mg | Cr | Cu | | | |
| 1 | Anode (B) | .23 | .055 | .45 | — | — | — | 1.4 | 6.1 | 63.5 |
| | Cathode (F) | .098 | .061 | .61 | 1.04 | .028 | — | | | |
| 2 | Anode (C) | .10 | .063 | .64 | — | — | — | 1.9 | 9.0 | 46.1 |
| | Cathode (F) | .098 | .061 | .61 | 1.04 | .028 | — | | | |
| 3 | Anode (H) | .24 | .62 | 1.15 | — | .031 | 1.2 | 5.7 | 7.4 | 55.5 |
| | Cathode (F) | .098 | .061 | .61 | 1.04 | .028 | — | | | |
| 4 | Anode | .030 | .050 | 1.0 | — | — | — | 6.6 | 11.7 | 29.9 |
| | Cathode | .098 | .061 | .61 | 1.04 | .208 | — | | | |
| 5 | Anode | .23 | .055 | .45 | — | — | — | 1.0 | 9.8 | 30.5 |
| | Cathode | .097 | .051 | .62 | 1.02 | — | — | | | |

Also shown in Table V is the percent reduction in the average pit depth on the cathode material in the galvanic couple as compared with the same material in an environment where free corrosion would occur (Example II data). It is believed particularly noteworthy that the reduction in average pit depth on the cathode material is not related to the average protection current density. Thus, it is apparent that for this particular cathode material composition some anode materials can provide significantly more protection than other anode materials. This example demonstrates that, for a core containing magnesium, manganese and chromium can be protected by a cladding containing manganese and silicon in certain amounts. It is also extremely significant that for the cathode-anode combinations studied, there was no reversal of the protective current, that is to say, the anode materials were at all times protective to the cathode materials.

EXAMPLE IV

Two 0.060 inches gauge composites having a 0.005 inches thick cladding on both sides were fabricated. These composites were based on the two composites in Example III which displayed the greatest reductions in the average pit depth of the cathode material as compared to the same cathode material in an environment where free corrosion would occur, couples 1 and 3 of Example III. These composites were fabricated by hot rolling the core and the cladding alloys together so as to form a metallurgically bonded composite. The final step in the preparation of the composites was a cold reduction from 0.15 inch gauge plate to 0.060 inch gauge sheet, a reduction of 60%. The composition of these composites and their mechanical properties measured in the rolling direction is given in Table VI.

TABLE VI

SPECTROSCOPIC CHEMICAL ANALYSIS AND MECHANICAL PROPERTIES OF CLAD ALLOYS

| | | Composite Percent Spectroscopic Analysis | | | | | | | 0.2% Offset Yield Strength KSI | Ultimate Strength KSI | Percent Elongation |
|---|---|---|---|---|---|---|---|---|---|---|---|
| | | Si | Fe | Mn | Mg | Cr | Cu | Zn | | | |
| Composite 1 | Clad | .21 | .04 | .50 | .096 | .013 | .016 | <.01 | 29.35 | 29.71 | 3.3 |
| H16 | Core | .13 | .03 | .61 | 0.97 | .22 | .020 | <.01 | | | |

TABLE VI—Continued

SPECTROSCOPIC CHEMICAL ANALYSIS AND MECHANICAL PROPERTIES OF CLAD ALLOYS

| | | Composite Percent Spectroscopic Analysis | | | | | | | 0.2% Offset Yield Strength KSI | Ultimate Strength KSI | Percent Elongation |
|---|---|---|---|---|---|---|---|---|---|---|---|
| | | Si | Fe | Mn | Mg | Cr | Cu | Zn | | | |
| Composite 3 | Clad | .24 | .62 | 1.15 | .008 | .03 | .12 | <.047 | 30.5 | 30.87 | 3.4 |
| H16 | Core | .11 | .04 | .61 | 1.0 | .21 | .029 | <.01 | | | |
| 1100 H16 (nominal) composition) | | Commercial Purity Aluminum | | | | | | | 20.0 | 21.0 | 6.0 |
| 3003 H16 (nominal composition) | | .6* | .7* | 1.2 | — | — | .2* | <.01 | 25.0 | 26.0 | 5.0 |
| 7072/3003 | Clad | .7 | .7 | .1* | .1* | — | .1 | <.01 | 25.0 | 26.0 | 4.0 |
| H18 (nominal composition) | Core | .6* | .7* | 1.2 | — | — | .2* | <.01 | | | |

*maximum level

Also shown in Table VI are typical mechanical properties for 1100, 3003 and 7072 clad 3004 grade aluminum, alloys which are commonly used where corrosion resistance is important. It is believed significant that the composite alloys of the present invention possesses significantly improved mechanical properties, when compared with conventional alloys. Specimens of the two composite materials were exposed to flowing tap water as previously described for periods of 60 and 120 days. The degree of corrosion was evaluated and the results are shown in Table VII.

Also shown in Table VII are typical corrosion results for 1100, 3003 and 7072 clad 3004 grade aluminum alloy in similar temper. Again, the composite alloys of the present invention display a measurable improvement over the conventional aluminum alloys which have heretofore been used where corrosion resistance is important. Some idea of the mechanism by which the corrosion and pit depth values are reduced by the present invention may be obtained by considering the values for mean pit depth. For both of the composites these values range between 5.1 to 6.5 mils. This indicates that the formation of the pits is largely limited to the thickness of the cladding material, in this case 5 mils. This fact has been confirmed by metallographic observations of clad materials. The corrosion is observed to be almost entirely limited to the cladding material and it has been observed that the corrosion process occurs largely at the interface between the core and the cladding material and that the core material is highly protected until the cladding material has been completely removed by the corrosive action of the coolant.

EXAMPLE V

An experiment was performed to investigate the effect of the formation of a protective film on the composite material.

TABLE VII

CORROSION OF COMPOSITES IN FLOWING WATER

| | Weight Loss mg cm$^{-2}$ | | Mean Pit Depth (mils) | | Max. Pit Depth (mils) | | Sheet Thickness (mils) |
|---|---|---|---|---|---|---|---|
| | 60 Days | 120 Days | 60 Days | 120 Days | 60 Days | 120 Days | |
| Composite 1 | 2.4 | 8.5 | 5.2 | 6.0 | 6.0 | 7.7 | 60.0 |
| Composite 2 | 13.0 | 25.2 | 5.1 | 6.5 | 6.3 | 8.9 | 60.0 |
| 1100 | 15.5 | 27.2 | 26.9 | 26.3 | 43.7 | 39.2 | 58.4 |
| 3003 | 17.7 | 26.2 | ** | ** | ** | ** | 27.5 |
| 7072/3004 | 8.6 | * | 8.4 | * | 10.4 | * | 50.8 |

\* Data not available
\*\* Insufficient data to form an accurate mean value.
Perforation of sheet occurred by a pit from one side.

Many fabrication processes which might be used with the composite material of the present invention result in the exposure of the core material. For example, in the fabrication of welded tubing the welding and scarfing processes will result in the exposure of the core material. Although some degree of galvanic protection will result even when the core material is exposed, it naturally is desirable to increase the corrosion resistance of the composite material.

The protective film that was investigated is a form of aluminum hydroxide known as Boehmite. Boehmite may be formed by exposing an aluminum surface to steam or water at a temperature in excess of 70° C. The rate of film formation may be increased by using an aqueous solution containing organic materials such as amines or amides. Composite 1 from Example IV was treated in steam at 250° F for a period of 8 hours to form a Boehmite film having a thickness of 5,000 A. Samples of this treated composite were exposed to flowing tap water as previously described for periods of 60, 120 and 180 days. A series of shallow slots were machined into the composite material prior to Boehmite formation to expose the core and thereby simulate a fabrication process such as scarfing. Also samples of 6061-T6 which had been similarly treated were exposed along with untreated samples of 6061-T6. Table VIII shows the results of this experiment.

TABLE VIII

|  | Exposure Time Days | Weight Loss (mg/cm²) | Mean Pit Depth (mils) | Max. Pit Depth (mils) | Max. Pit Depth In Exposed Slots (mils) |
| --- | --- | --- | --- | --- | --- |
| 1 H16 | 60 | 2.4 | 5.2 | 6.0 | 7.7 |
|  | 120 | 8.5 | 6.0 | 7.7 | 16.3 |
|  | 180 | 17.0 | 7.1 | 9.4 | 18.1 |
| 1 H16 +Boehmite | 60 | .02 | — | — | — |
|  | 120 | .70 | — | 5.9 | — |
|  | 180 | 1.2 | 6.3 | 8.9 | — |
| 6061 T6 | 60 | 20.0 | 16.4 | 24.0 | NA* |
|  | 120 | 30.4 | 19.4 | 36.0 | NA* |
|  | 180 | 24.1 | 21.5 | 34.4 | NA* |
| 6016 T6 +Boehmite | 60 | 7.1 | 15.5 | 20.9 | NA* |
|  | 120 | 9.2 | 18.5 | 30.5 | NA* |
|  | 180 | 19.6 | 15.3 | 25.7 | NA* |

*Not applicable - the 6061 samples did not have milled slots.

It is noteworthy that the Boehmite film has greatly reduced the weight loss of the composite material. Even after 180 days the weight loss of the treated material is more than an order of magnitude less than the untreated composite. Similarly, it is evident that the Boehmite film is extremely effective in protecting the exposed core material from pitting. Even after 180 days the treated composite did not have any pits in the exposed core material although the untreated material had extremely deep pits. It is somewhat surprising that the Boehmite film is so much more effective in protecting the composite than in protecting the 6061 alloy. For example, in terms of total weight loss the treated 6061 material is only about 20% better than the untreated 6061 material after 180 days.

To be effective the Boehmite film must be from 2,000 to 20,000 A thick and is preferrably formed after the fabrication and assembly of the heat exchanger device. In this way, the Boehmite film will cover any scratch or defect which may be produced by the assembly process as well as any exposed core areas which may result from fabrication process.

This invention may be embodied in other forms or carried out in other ways without departing from the spirit or essential characteristics thereof. The present embodiment is therefore to be considered as in all respects illustrative and not restrictive, the scope of the invention being indicated by the appended claims, and all changes which come within the meaning and range of equivalency are intended to be embraced therein.

What is claimed is:

1. A corrosion resistant aluminum alloy composite comprising:

A. an aluminum alloy core consisting essentially of from .5 to 3.0% magnesium, .3 to 1.0% manganese, .1 to .3% chromium, .001 to .003% titanium, .001 to .3% silicon, .001 to .2% iron, .001 to .1% copper, and .001 to .1% zinc, balance aluminum; and B. an aluminum alloy cladding, metallurgically bonded to at least one surface of the core, consisting essentially of from .001 to .1% magnesium, .2 to 1.5% manganese, .001 to .1% chromium, .001 to .03% titanium, .03 to .3% silicon, .001 to .05% copper and .001 to .4% zinc, balance aluminum.

2. A composite as in claim 1 wherein the core contains from .8 to 1.2% magnesium, .4 to .7% manganese, .2 to .3% chromium, .01 to .02% titanium, .001 to .15% silicon, .001 to .06% iron, .001 to .01% copper, .001 to .05% zinc, balance aluminum.

3. A composite as in claim 1 wherein the cladding contains .001 to .05% magnesium, .3 to 1.0% manganese, .02 to .05% chromium, .01 to .02% titanium, .1 to .25% silicon, .001 to .01% copper, .001 to .25% zinc, balance aluminum.

4. A composite as in claim 1 wherein the cladding has a thickness of .001 to .100 inches.

5. A corrosion resistant aluminum alloy composite comprising:

A. an aluminum alloy core containing from 1.5 to 3.0% magnesium, .3 to 1.0% manganese, .1 to .3% chromium, .001 to .003% titanium, .001 to .3% silicon, .001 to .2% iron, .001 to .1% copper, and .001 to .1% zinc, balance aluminum;

B. an aluminum alloy cladding, metallurgically bonded to at least one surface of the core, containing from .001 to .1% magnesium, .2 to 1.5% manganese, .001 to .1% chromium, .001 to .03% titanium, .03 to .3% silicon, .001 to .5% copper and .001 to .4% zinc, balance aluminum; and C. a layer of Boehmite, having a thickness of from 2,000 to 20,000 A, formed on the cladding.

6. A composite as in claim 5 wherein the core contains from .8 to 1.2% magnesium, .4 to .7% manganese, .2 to .3% chromium, .01 to .02% titanium, .001 to .15% silicon, .001 to .06% iron, .001 to .01% copper, .001 to .05% zinc, balance aluminum.

7. A composite as in claim 5 wherein the cladding contains .001 to .05% magnesium, .3 to 1.0% manganese, .02 to .05% chromium, .01 to .02% titanium, .1 to .25% silicon, .001 to .01% copper, .001 to .25% zinc, balance aluminum.

8. A composite tubing comprising:

A. an aluminum alloy core consisting essentially of from .5 to 3.0% magnesium, .3 to 1.0% manganese, .1 to .3% chromium, .001 to .003% titanium, .001 to .3% silicon, .001 to .2% iron, .001 to .1% copper, and .001 to .1% zinc, balance aluminum; and B. an aluminum alloy cladding, metallurgically bonded to at least one surface of the core, consisting essentially of from .001 to .1% magnesium, .2 to 1.5% manganese, .001 to .1% chromium, .001 to .03% titanium, .03 to .3% silicon, .001 to .05% copper and .001 to .4% zinc, balance aluminum.

9. A composite tubing as in claim 8 wherein the core contains from .8 to 1.2% magnesium, .4 to .7% manganese, .2 to .3% chromium, .01 to .02% titanium, .001 to .15% silicon, .001 to .06% iron, .001 to .01% copper, .001 to .25% zinc, balance aluminum.

10. A composite tubing as in claim 8 wherein the cladding contains .001 to .05% magnesium, .3 to 1.0% manganese, .02 to .05% chromium, .01 to .02% titanium, .1 to .25% silicon, .001 to .01% copper, .001 to .25% zinc, balance aluminum.

11. A composite tubing as in claim 8 wherein the cladding has a thickness of .001 to .100 inches.

12. A composite tubing comprising:
  A. an aluminum alloy core containing from .5 to 3.0% magnesium, .3 to 1.0% manganese, .1 to .3% chromium, .001 to .003% titanium, .001 to .3% silicon, .001 to .2% iron, .001 to .1% copper, and .001 to .1% zinc, balance aluminum; and
  B. an aluminum alloy cladding, metallurgically bonded to at least one surface of the core, containing from .001 to .1% magnesium, .2 to 1.5% manganese, .001 to .1% chromium, .001 to .03% titanium, .03 to .3% silicon, .001 to .05% copper and .001 to .4% zinc, balance aluminum.
  C. a layer of Boehmite, having a thickness of from 2,000 to 20,000 A, formed on the cladding.

13. A composite tubing as in claim 12 wherein the core contains from .8 to 1.2% magnesium, .4 to .7% manganese, .2 to .3% chromium, .01 to .02% titanium, .001 to .15% silicon, .001 to .06% iron, .001 to .01% copper, .001 to .25% zinc, balance aluminum.

14. A composite tubing as in claim 12 wherein the cladding contains .001 to .05% magnesium, .3 to 1.0% manganese, .02 to .05% chromium, .01 to .02% titanium, .1 to .25% silicon, .001 to .01% copper, .001 to .25% zinc, balance aluminum.

15. A composite tubing as in claim 12 wherein the cladding has a thickness of .001 to .100 inches.

* * * * *

UNITED STATES PATENT OFFICE
CERTIFICATE OF CORRECTION

Patent No. 3,859,058           Dated January 7, 1975

Inventor(s) William H. Anthony et al.

It is certified that error appears in the above-identified patent and that said Letters Patent are hereby corrected as shown below:

In Column 1, line 57 - after the words "combination with" insert ---the drawings and---.

In Column 2, Table I - in the column "Preferred % Range" for Titanium "0.01 - 0.2" should read ---0.01 - 0.02---;

In Column 2, Table II - in the column "Preferred % Range" for Silicon "0.0 - 0.25" should read ---0.1 - 0.25---.

In Column 6, lines 45 & 46 - the word "inches" should read ---inch---.

In Column 9, Table VIII - "6016 T6" should read ---6061 T6---;

Signed and sealed this 15th day of April 1975.

(SEAL)
Attest:

RUTH C. MASON
Attesting Officer

C. MARSHALL DANN
Commissioner of Patents
and Trademarks